W. H. ROE.
CORN HARVESTER.
APPLICATION FILED JULY 19, 1912.

1,095,030.

Patented Apr. 28, 1914.

Witnesses

William H. Roe
Inventor,
by C. A. Snow & Co.
Attorneys.

W. H. ROE.
CORN HARVESTER.
APPLICATION FILED JULY 19, 1912.

1,095,030.

Patented Apr. 28, 1914.
7 SHEETS—SHEET 3.

Fig. 3.

Witnesses

William H. Roe Inventor,
by C. A. Snow & Co.
Attorneys.

W. H. ROE.
CORN HARVESTER.
APPLICATION FILED JULY 19, 1912.

1,095,030.

Patented Apr. 28, 1914.

Witnesses

William H. Roe
Inventor by C.A. Snow & Co.
Attorneys

W. H. ROE.
CORN HARVESTER.
APPLICATION FILED JULY 19, 1912.

1,095,030.

Patented Apr. 28, 1914.

Witnesses

William H. Roe, Inventor, by C. A. Snow & Co., Attorneys.

UNITED STATES PATENT OFFICE.

WILLIAM H. ROE, OF BALTIMORE, MARYLAND.

CORN-HARVESTER.

1,095,030.  Specification of Letters Patent.  Patented Apr. 28, 1914.

Application filed July 19, 1912. Serial No. 710,516.

*To all whom it may concern:*

Be it known that I, WILLIAM H. ROE, a citizen of the United States, residing in Baltimore city and State of Maryland, have invented a new and useful Corn-Harvester, of which the following is a specification.

The present invention relates to improvements in corn harvesters, the primary object of the present invention being the provision of a corn harvesting machine for cutting a single row of standing crop and to deliver it to the shock row loose or without binding, the said machine being provided with an adjustable stalk feeding mechanism so constructed and arranged as to engage the growing stalks at a point near enough to the ground to insure the proper feeding of the same whether in a natural or beaten down position, the conveying means comprising a plurality of conveying chains inclinedly disposed from the forward end of the machine to the rear thereof so that the stalks are engaged at the proper point throughout the height thereof and carried in a vertical or upright position from the forward end to the rear end of the harvester.

A further object of the present invention is the provision of a conveyer for the stub ends of the cut stalks which causes the said ends to be moved at a uniform rate with the upper ends thereof and whereby the said stub ends are guided to a stub receptacle while the stalk ends are tilted and thrown transversely of the path of the machine within a fork, said stub receptacle and fork constituting a carrier for the stalks.

A still further object of the present invention is the provision of a stub end receiver for the cut stalks so disposed in connection with the stalk receiving fork that when the said fork is operated to deposit the stalks, that the stub ends are retarded to such a degree as to cause the stalks to assume a fallen position substantially parallel to the course of travel of the harvester with the butt or stub ends toward the harvester, thus positioning the cut stalks so that they will not interfere with the travel of the harvester when cutting the next adjacent row and permitting them to be in ready position for shocking.

A still further object of the present invention is a novel form of stalk conveying and carrying chains, said chains being properly supported in angle irons which form a guide and receptacle for the chains, each of said chains being provided with stalk engaging fingers which are disposed in coöperative relation to each other to engage the stalks at various points throughout the height thereof to retain said stalks upright during the passage from the cut position to the depositing position.

A still further object of the present invention is the provision of a butt end engaging means or conveyer disposed to receive the butt ends of the stalks that are being cut and propelling them to an inclined chute and finally to a stub or butt end receptacle disposed at one side so that when the stalks are in the carrier, the same are lying transversely to the path of travel of the harvester, the upper ends of the stalks being acted upon by the conveyer which tends to throw the ends outwardly and downwardly transversely of the harvester.

A still further object of the present invention is the provision of a frame having a draft attachment connected thereto that equalizes the pull so that the harvester does not have any side draft that tends to push inwardly or outwardly the growing stalks, but is so disposed as to be guided properly to engage the standing row of corn without any lateral strain being thrown upon the tongue and draft appliances.

With the foregoing and other objects in view which will appear as the description proceeds the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In describing the present invention the respective mechanisms will be described separately.

*Frame structure.*—The frame of the corn harvester, consists of the angle irons 1, 2 and 3 which are so connected as to form a draft attaching means at the forward portion of the frame and connected to the rear portion of the respective members 1, 2 and 3 is a rectangular framework composed of the transverse bar 4, the side bars 6 and 7 and the rear transverse bar 8. This constitutes the main frame, and connected longitudinally between the bars 4 and 8 are the bars 9 and 9' which form a truss for the frames. A cross plate 10 is connected to the outer bar 7 intermediate of the ends of the longitudinal bar 9' and co-acts with the bar or bracket 11, supported in connection with the bar 7 and connected to the rear bar 8 by means of the bracket or arm 12. Connected to the inner end of the bar 11 is a bearing sleeve 13, and carried by the plate 10 in alinement with the sleeve is a bearing sleeve 14. Journaled upon the upper portion of the bar 7 of the main frame is a bearing sleeve 15 for the reception of the hooked end of the pivoted rod 16, whose free end 17 carries a rack 18 operably connected to be operated by the worm cam 19 (of well known construction), so as to regulate the height of the free end of the arm 16 and consequently raise or lower the main frame of the machine. The lever 20 actuates the worm cam 19 thus lifting the free end of the arm 16 and the stub shaft 22 which carries the supporting wheel 23.

Figure 4:
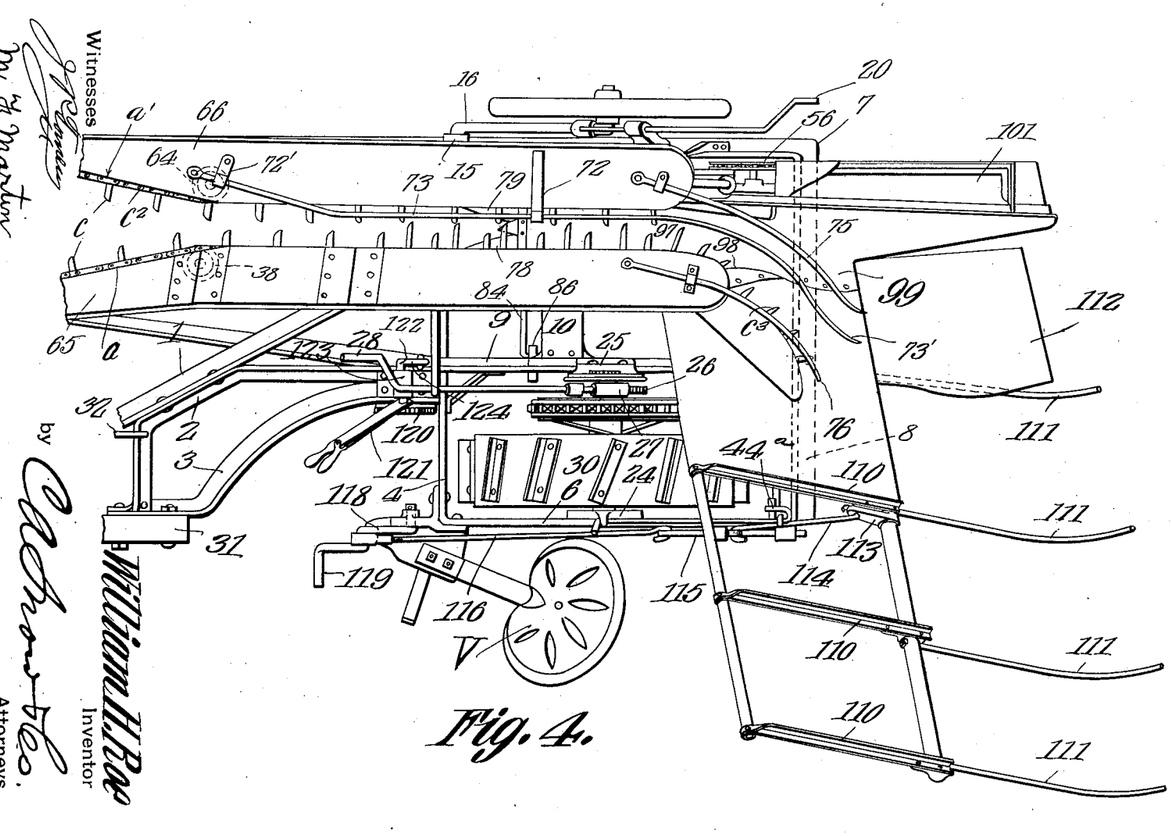
Fig. 4 is a top plan view of the main portion of the harvester, the draft portion and guiding ends of the stalk conveyers not being shown.

Carried by the respective bars 6 and 9 of the main frame are the adjustable boxings 24 and 25 which are moved vertically with relation to the main frame, so as to raise the main frame similarly to the mechanism described for the wheel 23 and by means of the gear 26, worm 27 and actuating lever 28. These boxings 24 and 25 carry the short shaft 29 which has mounted thereon the hub or sleeve of the traction wheel 30, said traction wheel being mounted within the main frame as clearly shown in Fig. 4 between the bars 6 and 9 and 9'.

Connected to the forward portion of the frame and slightly outside of the traction path of the traction wheel 30 is the draft tongue 31, the draft equalizing means 32 being connected so as to carry the draft devices 33 in a proper position to prevent side draft so that there is no torsion or tendency to move the tongue toward the center of the machine, this structure producing an equal draft and insuring the proper guiding of the feeding mechanism, to be later described, during the harvesting of the standing crop.

The bars $9^a$—$9^b$ extend forward from the main frame and connect at their outer ends with the bars 77 and $36^a$ at their respective sides. The bars 77 and $36^a$ are securely fastened to the plate 10 and also extend forward. The bars $9^a$—$9^b$, 77, 36, 36' and $36^a$ are connected to, and form a support to carry the forward ends of the gathering and conveying mechanism of the harvester.

*Stalk feeding mechanism.*—The stalk feeding mechanism of this harvester, is carried by the main adjustable frame and upon each side is supported in proper position by means of the upstanding rods or plates 35 at one side and 35' at the other side, the respective conveying means C, C', and $C^2$, being properly supported thereby, as will hereinafter appear.

In producing the feeding mechanism for the stalks, it is preferable to use sprocket wheels and sprocket chains, said sprocket wheels being preferably journaled in angle iron frames, thus producing a very durable structure and at the same time retaining the sprocket wheels in their respective journals and the conveyer chains at their relative position, said angle irons also providing a durable and efficient stalk abutting and guiding surface.

In this instance, the angle irons 36 and 36' have journaled therein the forward adjustable chain tightening and guiding sprocket 37, the guiding sprocket 38 and, the drive sprocket 39 upon the upper end of the shaft 40, these sprockets being the main drive and guiding means for the lower stalk conveyer C. The detailed arrangement of the respective sprockets and conveyers is clearly shown in Fig. 5, the same being shown in diagram with the relative position of the driving mechanism thereto.

Figure 8:
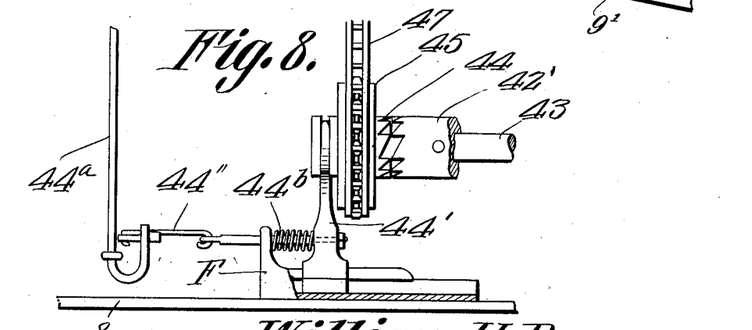
Fig. 8 is an enlarged detail view of the main clutch mechanism, whereby power is transmitted to the various conveying mechanisms.
Figure 10:
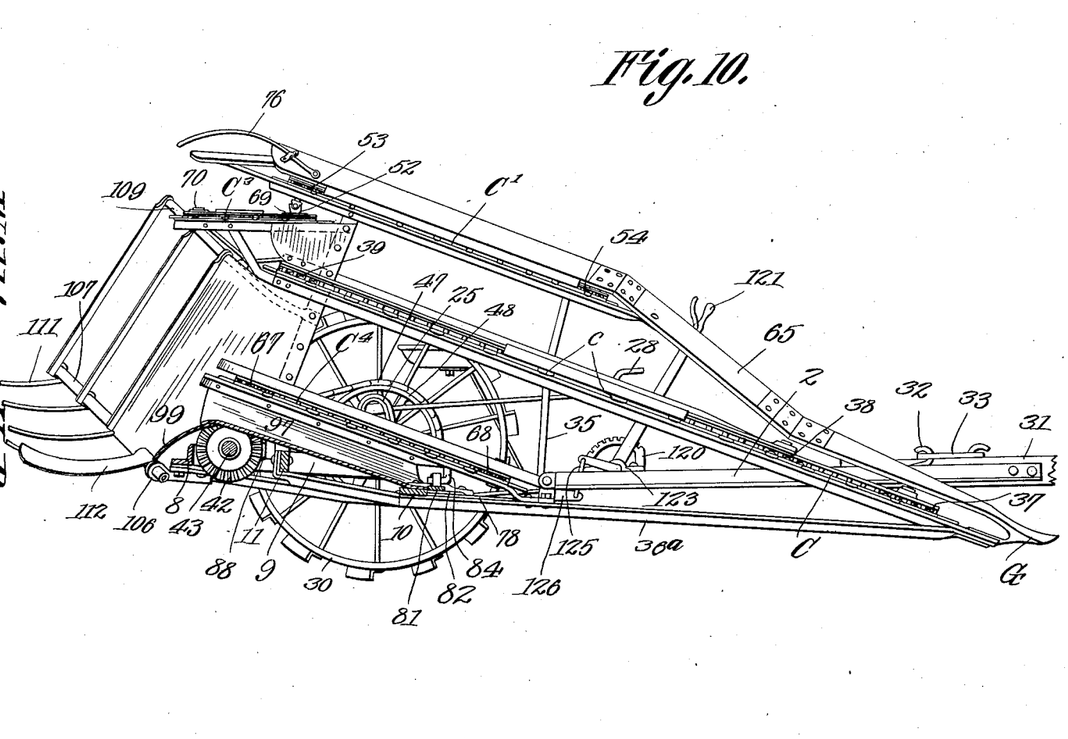
Fig. 10 is a longitudinal section taken between the conveyer chains and looking toward the seat side of the machine.

The shaft 40 has keyed upon its lower end a small bevel pinion 41 which is in mesh at all times with the inner double bevel pinion 42 keyed upon and rotatable with the main drive shaft 43, a sliding clutch member 44 carrying sprocket 45 being mounted rotatably upon one end of said shaft 43 and in coactive relation with the sleeve 42', so that motion may be transmitted from the traction wheel 30 to the shaft 43 and consequently the shaft 40. The clutch mechanism is clearly shown in detail in Fig. 8 and consists of the yoke 44', which is carried upon the frame F mounted upon the bar 8, its stem being slidably mounted in said frame so as to move the clutch member 44 out of engagement with the sleeve 42', through the medium of the link 44'' and the operating rod 44ª which is disposed in easy access of the operator. The spring 44ᵇ normally exerts a tension to hold the clutch members 44 and 42' in mesh, the operator moving the rod 44ª to retain the clutch in thrown out position.

In order to properly operate the shaft 43, a sprocket 45 is carried by the clutch member 44, a sprocket chain tightening sprocket 46 being disposed to tighten the sprocket chain 47, which is led over the sprocket wheel 45 to the large sprocket 48 keyed upon and rotatable with the hub or sleeve of the traction wheel 30. By this means it will be seen that as the corn harvester is drawn, the traction wheel 30 will rotate the sprocket 48 and consequently the clutch member 44 at all times, and when the clutch members 44 and 42' are in engagement that the motion will be transmitted to the transverse shaft 43.

Keyed upon and rotatable with the upper end of the shaft 40 is a gear 49 which meshes with an intermediate gear 50 and thereby transmits motion to the gear 51 mounted upon the lower end of the flexible shaft 52, which carries on its upper end the sprocket 53 which coacts with the sprocket 54 to actuate the upper top engaging conveyer chain C', the same being disposed above and in line with the rear end of the conveyer C so as to coact with the same and assist in propelling or moving the standing stalks after the cutting operation to the rear of the harvester. In order to simultaneously operate the stalk conveyer C², which is disposed in parallel and coacts with the conveyer C, a sprocket 55 is mounted upon the extreme end of the shaft 43 and has trained thereover a sprocket chain 56 which transmits motion through the sprocket wheel 57 to the short transverse shaft 58, this shaft 58 having mounted or keyed upon its inner end a bevel pinion 59, which is in mesh at all times with the bevel pinion 60 of the vertical shaft 61. This vertical shaft 61 has keyed upon the upper end thereof a sprocket 62 which coacts with the forward sprocket 64 and the chain tightening or guiding sprocket 63 to properly actuate through the shaft 43 the said conveying chain C², at the same speed and coincidently with the chain C. As before stated these conveyers are disposed at an incline so as to engage the stalk near the butt end thereof and gradually move upward upon the stalk so that the same is engaged intermediate of its ends when delivered to the rear end of the harvester. The casings 65 and 66 incase the respective conveyers which are provided with the small engaging fingers $c$, said casings 65 and 66 being cut away as at $a$ and $a'$ at their forward ends, so that the chains of the respective conveyers C and C² will be exposed, as shown, to receive the stalks and assist in uprighting the same until they are passed between the parallel walls of the respective casings 65 and 66, at which time they are placed between the coacting fingers $c$ of the respective conveyers and are properly guided toward the rear of the harvester. This feature is of utmost importance in that a moving surface is presented at the points $a$ and $a'$ against the standing stalks as the corn harvester is drawn toward the same and no glancing or sliding action thereupon is the result. By this means the stalks are properly gripped by the moving fingers $c$ and the bodies of the chains at this point, the stalks thus being properly guided to the cutting mechanism to be later described.

Keyed upon the shaft 40 near the lower end thereof is an auxiliary conveyer C⁴ which assists in the conveying of the stub or butt ends of the stalks to prevent any retardation thereof due to the inclined movement of the conveying means C and C², for as the stalks reach a point adjacent to the forward sprocket 68 of the said conveyer C⁴ the upper ends of the stalks have a tendency to move more rapidly than the butt ends. The sprocket 67 is therefore keyed upon the shaft 40 and coacts with the sprocket 68 to operate the conveyer C⁴, whose prongs $c'$ are disposed in the path to engage the butt ends of the stalks and move the same upon the top surface of the butt guide 97, to be later described.

In order to impart to the upper ends of the stalks a movement to the traction side of the machine, and at the same time cause the same to tilt and fall transversely into the holding forks, to be later described, is a conveyer C³ having the sprocket 69 mounted upon the lower portion of the flexible shaft 52 and a sprocket 70 carried in the frame 71, which is a continuation of one of the casings 65. This conveyer is inclined downwardly, and as before stated toward the traction side of the machine, and coacts with the various stalk guiding fingers 73' 75 and 76 respectively.

Figures 5, 9:
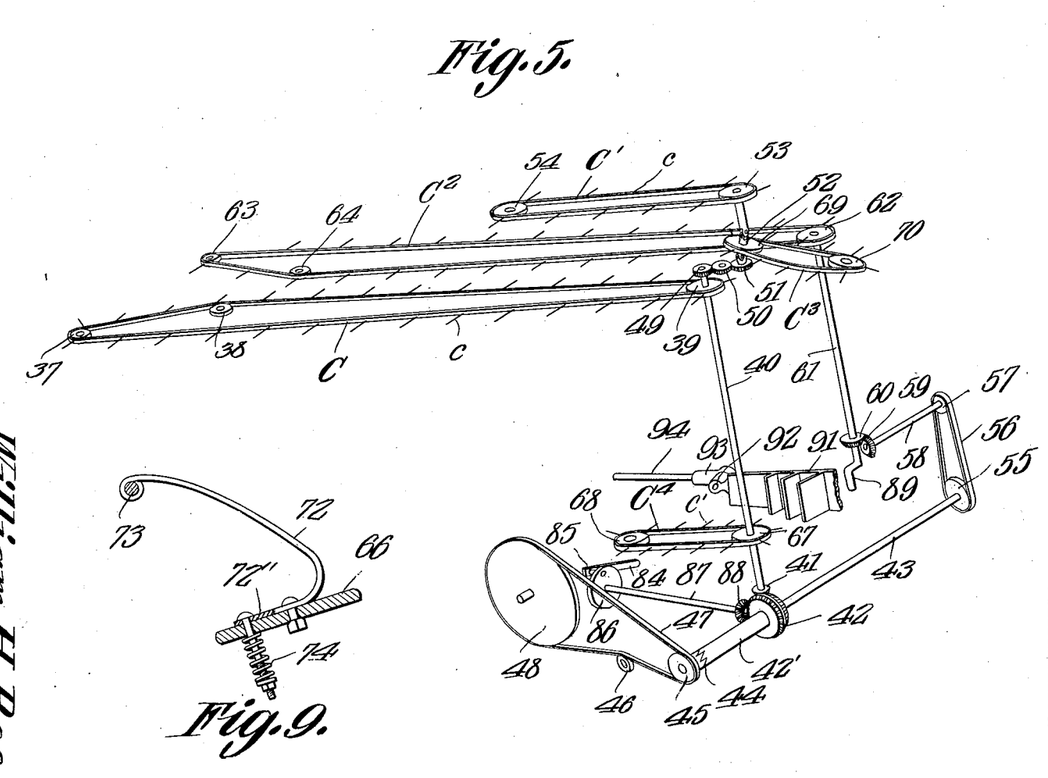
Fig. 5 is a diagrammatic perspective view showing the various conveyer mechanisms and the main drive thereof.
Fig. 9 is a detail view of one of the spring tensioned stalk guiding arms.

The stalk guiding finger 73' is disposed throughout the length of the casing 66 having its forward end connected and passed through the guide loops 72', while the intermediate portion thereof is mounted in a spring actuated arm or bracket 72 connected to and carried by the upper portion of the casing 66, the detailed structure of which is clearly shown in Fig. 9. The spring 74 as shown in Fig. 9 is so mounted as to normally hold the short terminal 72'' upon the casing 66 but if any undue strain be placed upon the rod 73, the said spring 74 will permit a slight tilting movement to prevent any breakage and at the same time yieldingly press the upper ends of the stalks into engagement with the fingers of the conveyer C' and in such inclined position as to finally tilt the stalks with the tops outwardly toward the traction side of the harvester. It will also be noted that the spring tensioned rod 73 presses the upper ends of the stalks toward and into engagement with the conveyer C³.

Figure 6:
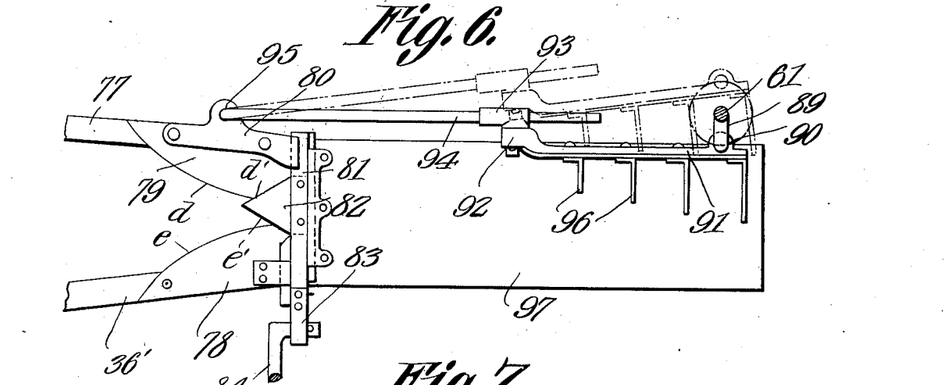
Fig. 6 is a top plan view of the lower portion of the butt end guide showing the stationary and reciprocatory knives.

*Stalk cutting mechanism.*—The stalk cutting mechanism as clearly shown in detail in Fig. 6, is connected to the rear end of the guide rods 36' and 77, the stationary blades 78 and 79 being connected to said respective guide rods and provided with opposed curved cutting edges $d$ and $e$. Connected to the rear end of the guide arm 77 and above the blade 79 is a casting 80 which forms a receptacle for the sliding end of the bar 81, which has connected thereto the reciprocatory cutter 82, which is provided with the cutting edges $d'$ and $e'$ which are disposed to coact respectively, with the cutting edges $d$ and $e$ of the stationary blades 79 and 78 respectively. The inner end of the reciprocatory bar 81, carrying the blade 82 is provided with a sleeve 83 to which is pivotally connected the link or pitman 84 connected by means of a pin 85 to the disk 86 keyed upon and rotatable with the shaft 87, said shaft 87 being provided with a pinion 88 which is in mesh at all times with the outer teeth of the double beveled gear 42. By this construction it will be seen that the rotation of the shaft 43 not only operates the stalk conveying mechanism but also operates the reciprocatory cutter 82 so as to properly cut the stalks as the same are guided to the cutting mechanism of the harvester.

*Stalk butt controlling mechanism.*—In order to properly assist in the movement of the butt ends of the respective stalks after the same have been acted upon and severed by the mechanism of the harvester, and properly guide the same upon the butt end guiding shelf 97, the crank arm 89 formed at the lower end of the shaft 61 is connected to the sleeve 90 so as to properly oscillate the plate 91, whose forward sleeve 92 is pivotally connected to the pin of the sleeve 93. This sleeve 93 is slidingly mounted upon a guide rod 94, whose forward end is pivoted to the casting 80 at 95, so that the rotation of the shaft 61 will impart to the plate 91 and the butt engaging and stepped fingers 96, a movement as clearly shown in full and dotted lines in Fig. 6. By this means the butt ends of the stalks are engaged at the forward stroke and carried backwardly over the shelf 97 and released upon the rear and inward movement of the plate 91, the respective flexible joints 90, 92, and 95 in combination with the sliding sleeve 93 permitting such movement. By this means there is no choking action of the stalks at this point but a continuous feed of the butt ends thereof is the consequence.

In order to prevent the butt ends of the stalks from being moved too far outwardly by the action of the fingers 96, a curved guiding plate 98 is disposed at the end of the butt end guiding shelf 97 in opposition to said fingers 96 and at the beginning of the inclined side of chute 99, which tends to guide the stub or butt ends of the stalks as the top ends thereof are thrown outwardly and transversely of the machine by means of the conveyer C³ and the guiding fingers 73', 75 and 76, said butt ends of the stalks being guided by the said inclined chute 99 into the butt end receptacle 100. This holder is preferably made of a portion of a cylinder with a bottom or end 101, the said bottom 101 being so disposed as to provide a vertical wall to limit the outward movement of the butt ends of the stalks toward the side of the harvester having the wheel 23. The rim of the receptacle 100 is connected to and supported by the plate 102 which is curved and has its lower end connected to the main frame of the machine while its upper end is connected to the underside of the frame carrying the conveyer C², thus retaining the receptacle 100 in the proper position with relation to the other mechanisms at all times.

Figure 1:
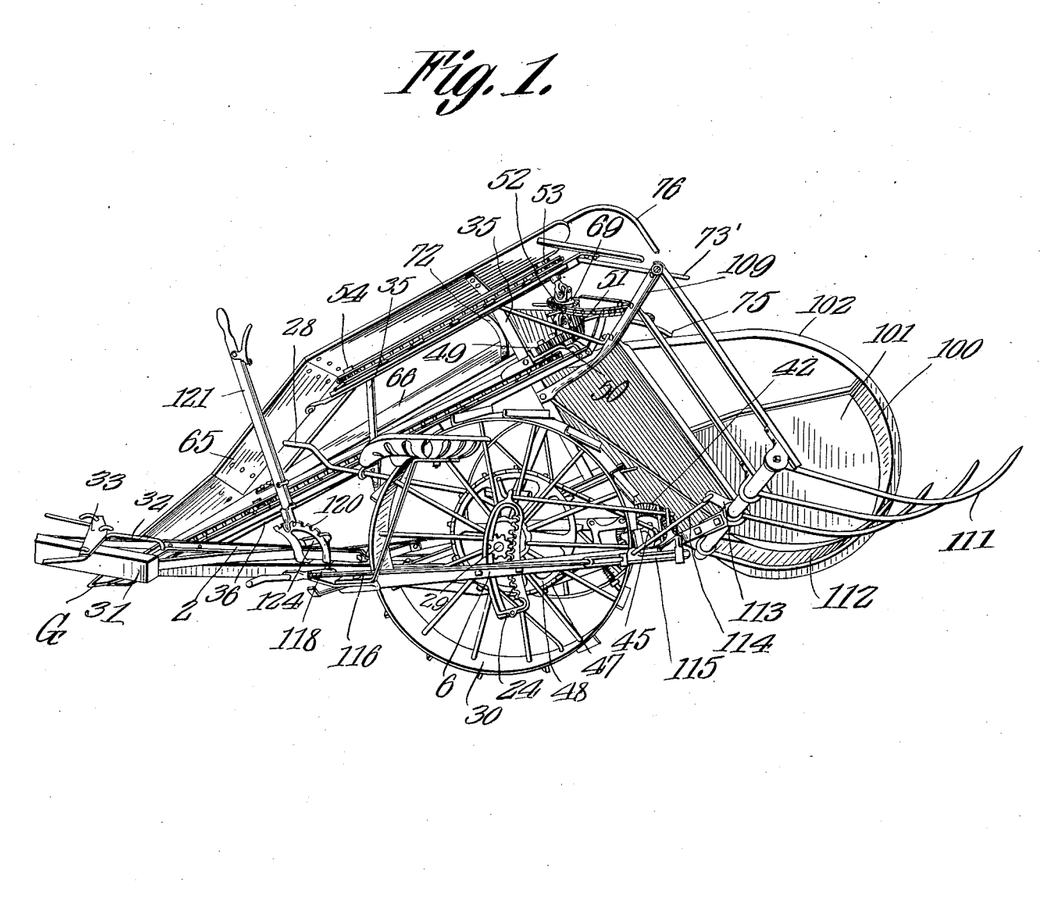
—Figure 1 is a perspective view of the complete corn harvester taken from the rear and at the traction side thereof.
Figure 2:
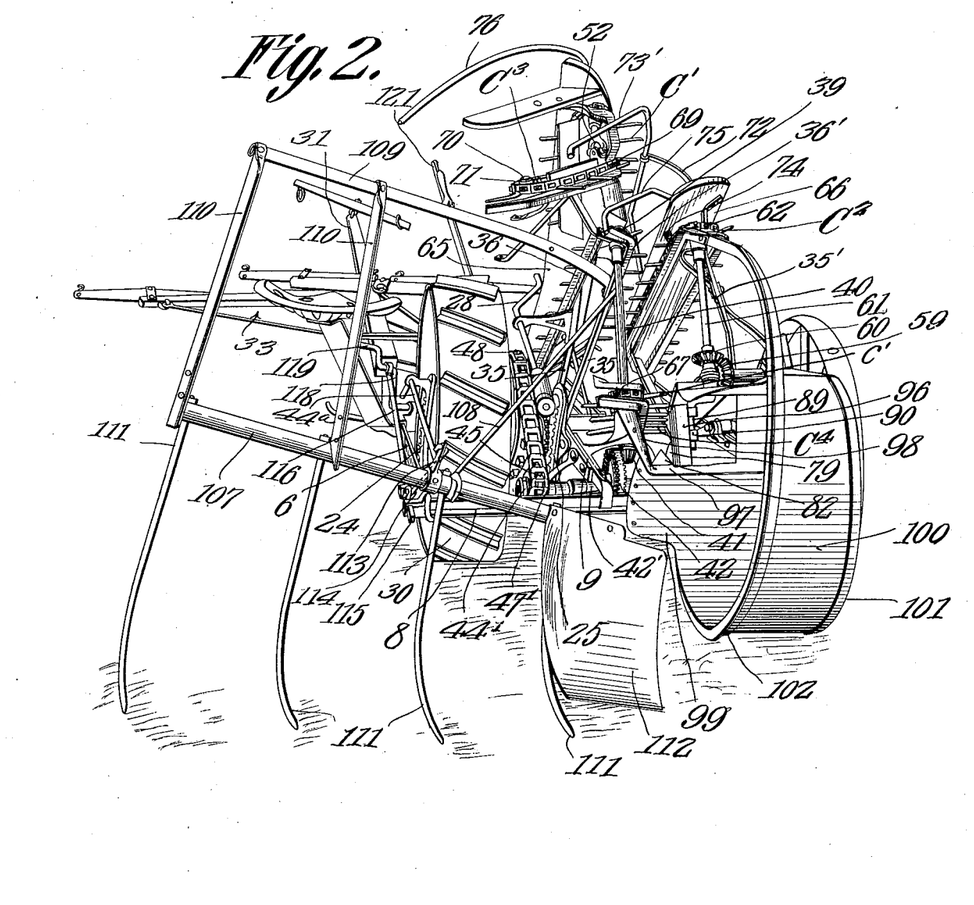
Fig. 2 is a perspective view taken from the rear thereof, the shock receiving fork being in dumping position, a portion of the stalk guiding chute being removed to show the gearing.
Figure 3:
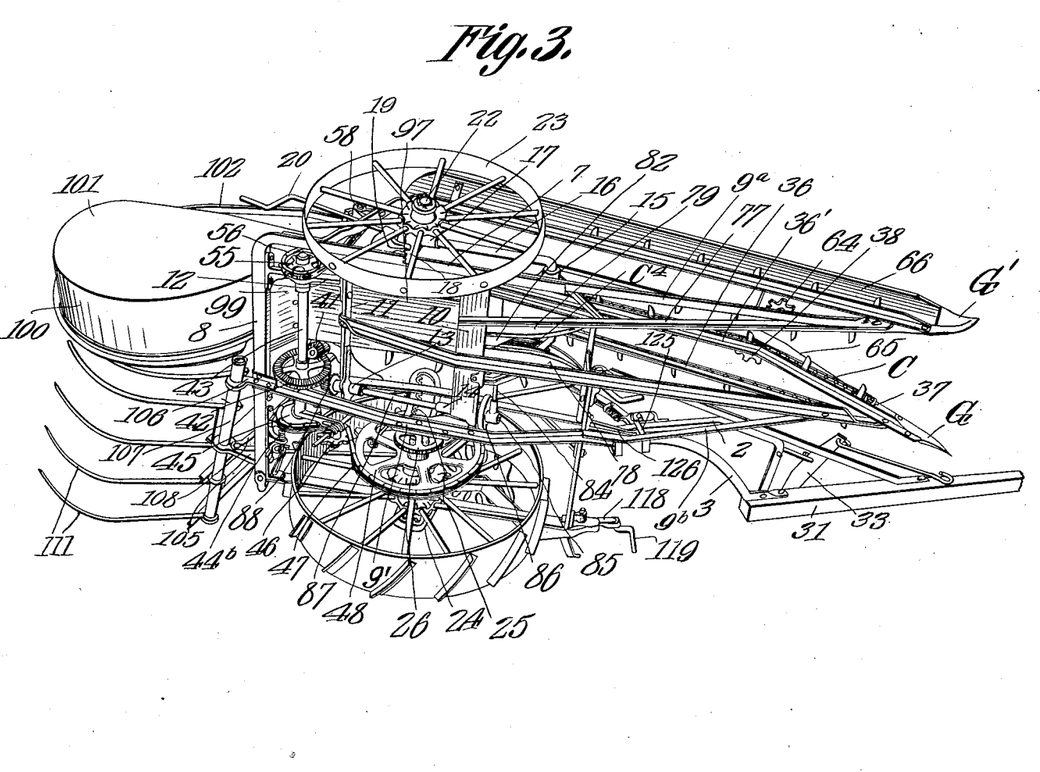
Fig. 3 is a bottom perspective view of the complete harvester tilted to rest upon the traction side thereof.

*Stalk carrier.*—The stalk carrier is disposed to coöperate with the stub or butt end receptacle 100, the arms 105 and 106 being disposed to the rear of the main frame of the harvester and having journaled therein the tubular shaft 107, said shaft having disposed thereabove the inclined brace 108, the curved guiding arm 109 and the other depending arms 110, these forming means whereby the top ends of the stalks are properly guided to the stalk receiving fingers 111. By this means the shaft 107 can be rotated or oscillated to move the stalk holding fingers 111 and butt end guiding shield 112 from stalk receiving position to the depositing position as clearly shown in Fig. 2.

The normal position of the fingers 111 and shelf or shield 112 is downwardly or into stalk depositing position and in order to hold the same in stalk receiving position, the lever 113 which is keyed to the tubular shaft 107 is connected by a link 114 to a sliding member or rod 115, which itself is connected by a rod 116 to a lever 118 controlled by the foot pedal 119, the operator sitting within the seat V having his foot normally upon the pedal 119 and exerting pressure enough to hold the stalk receiving fingers 111 and shelf or shield 112 into stalk receiving position, the operator releasing his foot when the proper number of stalks are accumulated.

The butt end receptacle 100 is disposed and constructed to be used in conjunction with the carrier fork and when in use the stalks as before stated are gradually moved from a vertical position or thrown outwardly toward the traction side of the harvester with the butt or stub ends thereof within the receptacle 100. When the stalk receiving arms 111 and shelf 112 have received a sufficient number of stalks, the operator as before stated, permits the same to fall by gravity, the arrangement of the fingers 111 causing the top of the stalks to engage the ground first. The friction of the top ends of the stalks with the ground and the moving of the corn harvester tends to turn the stalks, their butt ends being slightly retarded within the receptacle 100, until the butt ends of the stalks have been carried a sufficient distance to arrange the stalks upon the ground with their butt ends toward the corn harvester and the body of the stalks parallel and in line with the direction of travel. By this means the stalks are arranged in a better position for shocking and are not in the way when the next row of the standing crop is harvested. By this means it is also evident that stalks will be deposited at desired distances in straight lines and practically in line with the space between the respective conveyer casings 65 and 66.

Figure 7:
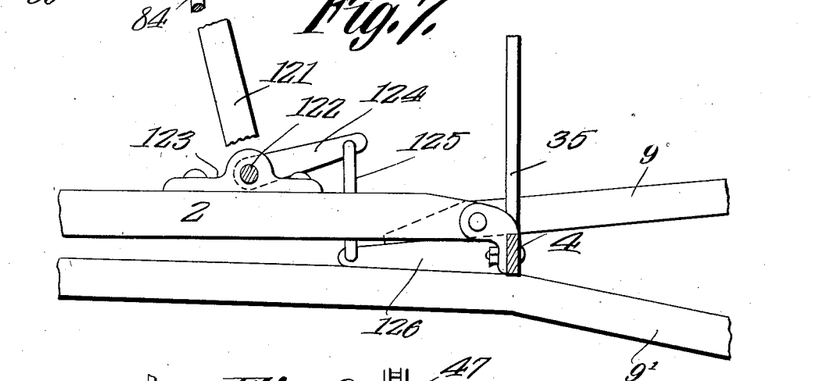
Fig. 7 is a detail view of the mechanism for controlling the tilt or adjustment of the guiding means.

*Adjusting mechanism for the forward end of stalk conveyer.*—In order to adjust the forward ends of the casings 65 and 66 and thereby position the same to pick up fallen stalks or present the stalks in the proper position to the cutting mechanism, the control mechanism as clearly shown in Fig. 7 is employed. In this instance a toothed segment 120 is disposed to control and lock the actuating lever 121, the same being mounted in ready access to the operator. A controlling shaft 122 mounted in the casting 123 is carried upon the upper face of the frame 2. The lever or arm 124 carried by the shaft 122 has its free end connected by a link 125 to an arm or lever 126 which itself is connected to the forward bar 4 of the main frame so as to tilt the forward end of the casings 65 and 66 to bring the stalk guiding ends G and G' thereof into the proper relative position to the growing stalks.

From the foregoing description taken in connection with the drawings, it is evident that a corn harvester constructed according to and embodying the present invention will efficiently cut and harvest a single row of corn at a time and insure the proper movement of the stalks in a vertical position to and beyond the cutting mechanism, at which time the stalks, at the upper ends thereof, are given an outward sliding position while the butt ends thereof, moving at the same speed, are moved toward a butt end receptacle simultaneously with the falling of the top ends of the stalks transversely of the path of travel of the harvester into a stalk carrier.

By the peculiar arrangement of the fork and butt end receptacle the stalks are deposited with the top ends first to the ground, the movement of the corn harvester as herein described moving the butt ends forwardly so that when finally deposited the fallen stalks rest with the butt ends toward the harvester and the body portions parallel with the path of travel of the same.

What is claimed is:—

1. A corn harvester, having a frame, a traction wheel, a plurality of inclinedly mounted stalk guiding and feeding means operably connected to the traction wheel, a cutting mechanism also connected to the traction wheel, butt end conveying means for engaging the butt ends of the stalks to insure the feeding thereof in consonance with the tops, means for throwing the tops of the stalks transversely of and inclined toward the rear of the harvester, a stalk receiving fork, a butt end receptacle and retarding drum mounted at the outlet end of the frame with its bottom in a vertical position and its rim horizontally disposed, said drum forming a receptacle for the butt ends of the stalks when the stalks are lying in the fork, and means for elevating and releasing the fork, said fork falling by gravity to release the body and top ends of the stalks so that the top ends engage the ground first, the rim of the butt end receptacle engaging and retarding the butt ends of the stalks to present the body of the stalks in parallel alinement to the direction of travel of the harvester.

2. A corn harvester, having a frame, a traction wheel, a plurality of inclinedly mounted stalk guiding and feeding means operably connected to the traction wheel, a cutting mechanism also connected to the traction wheel, butt end conveying means for engaging the butt ends of the stalks to insure the feeding thereof in consonance with the tops, means for throwing the tops of the stalks transversely of the harvester, a stalk receiving fork, a butt end receptacle to receive the butt ends of the stalks when in the fork, said receptacle having a bottom and rim, the bottom being disposed in a vertical position with the rim horizontally and toward the receiving fork, for receiving the butt ends when the stalks are lying within the fork, and means for elevating and releasing the fork, said fork falling by gravity to release the stalks top end first, the rim of the butt end receptacle engaging and retarding the butt ends of the stalks to present the body of the stalks in parallel alinement to the direction of travel of the harvester.

3. A corn harvester, having a frame, a plurality of inclinedly disposed conveyer casings mounted upon the frame, means for moving the forward ends thereof toward and from the ground, a plurality of stalk conveyers mounted in said casings, a plurality of angularly disposed spring stalk guides at the rear of the casing, a conveyer coacting with said guides for causing the tops of the stalks to be thrown transversely of the rear of the machine, butt end conveyers for moving the butts in consonance with said last mentioned conveyer, a pivoted gravity actuated stalk receiving fork disposed to receive the bodies of the stalks and hold them transversely of and inclined toward the rear of the machine, a stationary butt end receptacle mounted as a continuation of the fork, and means for locking and releasing the fork, said receptacle having a rim to engage and retard the butt ends of the stalks when the fork is released to deposit the stalks top end first.

4. A corn harvester, having a frame, means for delivering cut stalks rearwardly and in an upright position, a pivoted fork disposed transversely and inclined rearwardly of the frame to receive the tops and body portion of the stalks, a vertically disposed disk parallel to the line of travel of the harvester to limit the outward movement of the stalks by engaging the butt ends of the same when the stalks are in the fork, means for holding and releasing the fork, and a rim projecting from the lower rear portion of the disk to form a retarding means for the butt ends of the stalks as the fork delivers the top ends of the stalks to the ground.

In testimony that I claim the foregoing as my own, I have hereto affixed my signature in the presence in the presence of two witnesses.

WM. H. ROE.

Witnesses:
 JAMES F. GILLESPIE,
 HARRY E. POHLMANN.

Copies of this patent may be obtained for five cents each, by addressing the "Commissioner of Patents Washington, D. C."